US007082118B1

(12) United States Patent
Sethi

(10) Patent No.: US 7,082,118 B1
(45) Date of Patent: Jul. 25, 2006

(54) MAINTAINING SESSION CONNECTIVITY WHEN A MOBILE NODE MOVES FROM ONE LAYER 3 NETWORK TO ANOTHER

(75) Inventor: Aseem Sethi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 893 days.

(21) Appl. No.: 09/987,527

(22) Filed: Nov. 15, 2001

(51) Int. Cl.
*H04J 3/24* (2006.01)

(52) U.S. Cl. ....................................... 370/349; 370/331

(58) Field of Classification Search ................ 370/331, 370/349; 455/436
See application file for complete search history.

(56) References Cited

U.S. PATENT DOCUMENTS 6,515,974 B1 * 2/2003 Inoue et al. ................. 370/331
2001/0036184 A1 * 11/2001 Kinoshita et al. ........... 370/389

OTHER PUBLICATIONS

Moh et al. "Mobile IP Telephony: Mobility Support of SIP". IEEE. 1999, pp. 554-559.*
Elin Wedlund & Henning Schulzrinne; Entitled, "Mobility Support using SIP"; SIGMOBILE: ACM Special Interest Group on Mobility of Systems, Users, Data and Computing; pp. 76-82 Series-Proceeding-Article; Publisher- ACM Press, New York, NY, USA; Year of Publication: 1999 (7 Pages).
Henning Schulzrinne & Elin Wedlund; Entitled, "Application-Layer Moblility Using SIP"; Mobile Computing and Communications Review, vol. 4, No. 3, pp. 47-57; Jul. 2000 (9 Pages).
R. Rohit, N. Pai, R. Raghunarayan; Entitled, "Internet-Draft -Definitions of Managed Objects for Network Address Translators (NAT)"; Feb. 2001; (37 Pages).
F. Vakil, A. Dutta, J-C. Chen, M. Tauil, S. Baba, N. Nakajima, Y. Shobatake & H. Schulzrinne; Entitled, "Internet Draft- Supporting Mobility for TCP with SIP<draft-itsumo-sip-mobility-tcp-00.txt>"; Dec. 2000 (10 Pages).
M. Handley, H. Schulzrinne, E. Schooler & J. Rosenberg; Entitled, "Request for Comments: 2543-SIP: Session Initiation Protocol", Mar. 1999 (66 Pages).
Entitled, "3GPP TS 24.228 v0.1.0 (Nov. 2000)-3rd Generation Partnership Project; Technical Specification Group Core Network; Signaling flows for the IP multimedia call control based on SIP and SDP (Release 5)"; Published Sep. 2001; Org—www.3gpp.org (66 Pages).

* cited by examiner

*Primary Examiner*—Derrick Ferris
(74) *Attorney, Agent, or Firm*—Narendra Reddy Thappeta

(57) ABSTRACT

Maintaining session connectivity without termination when a mobile node is assigned a new layer-3 address upon moving from a old location to a new location. Routers between the mobile node and correspondent node are configured to perform network address translation (NAT) such that both the nodes can potentially use the old IP address in communicating with each other, and yet the packets are routed accurately using the new layer-3 address. As a result, the session may not be terminated at either of the nodes when the mobile node moves.

41 Claims, 6 Drawing Sheets

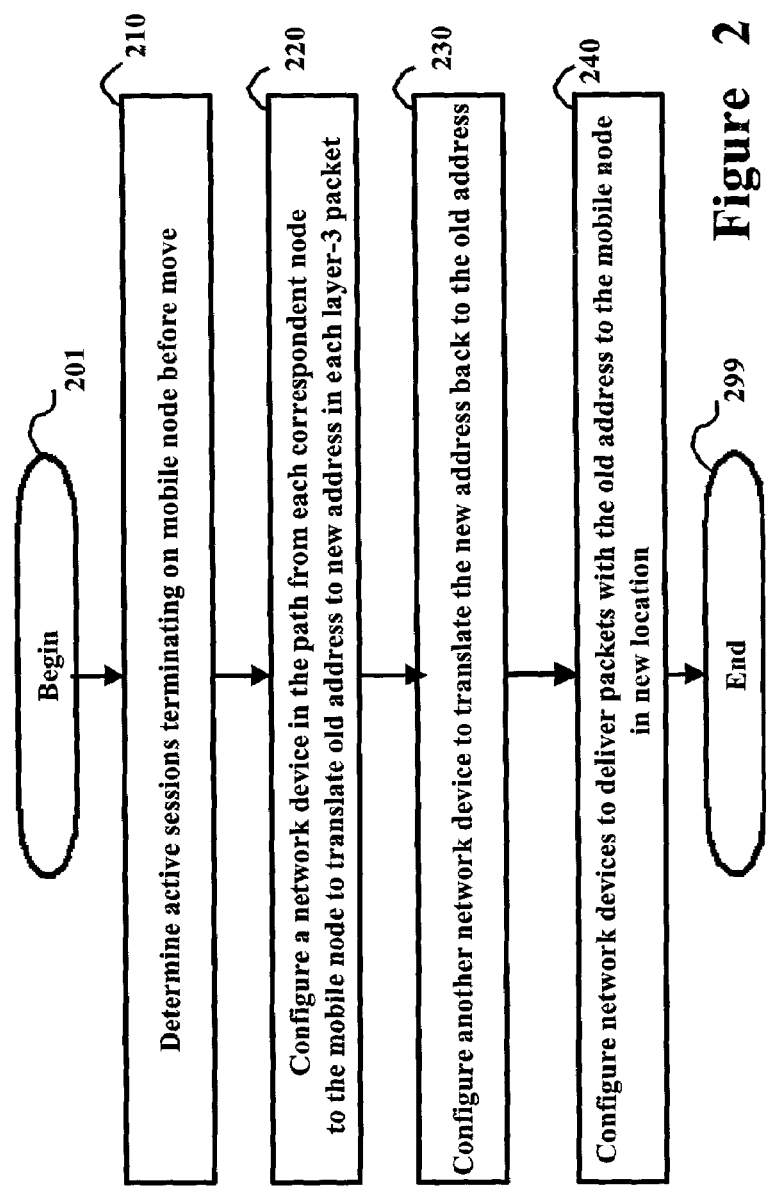

MAINTAINING SESSION CONNECTIVITY WHEN A MOBILE NODE MOVES FROM ONE LAYER 3 NETWORK TO ANOTHER

BACKGROUND OF THE INVENTION

1. Field of the Invention

The present invention relates to mobile communication applications, and more specifically to a method and apparatus for maintaining session connectivity when a mobile node moves from one layer 3 network to another.

2. Related Art

Mobile nodes refer to devices such as cell phones which are often carried by users from one physical location to another. Mobile nodes are used to communicate with other devices (generally referred to as correspondent nodes) using wireless protocols as is well known in the relevant arts. The communication often forms the basis for applications such as internet multimedia conferences, internet telephone calls and multimedia distribution.

Sessions are generally maintained to support applications between mobile nodes and correspondent nodes as is well known in the relevant arts. Session Initiation Protocol (SIP) is a common application-layer control (signaling) protocol for creating, modifying and terminating sessions as is also well known in the relevant arts. SIP is described in further detail in RFC 2543 entitled, "SIP: Session Initiation Protocol", available from www.ietf.org, and is incorporated in its entirety herewith.

Sessions in turn are often supported by layer-3 (e.g., Internet Protocol (IP)) network protocols. As is also well known, each mobile node needs to be assigned a layer-3 address. The layer-3 address is typically used by the corresponding correspondent node to send layer-3 packets to the mobile node. The network address portion of layer-3 network is used to route the packets to the mobile node.

Mobile nodes may be moved from one physical location to another. In general, it is desirable to provide seamless and uninterrupted support to applications executing on the mobile nodes even when mobile nodes move from one physical location to the other.

One feature that poses challenges to such support is the fact that devices in different geographical locations often operate using different layer-3 network address spaces for the devices. In general, a node in a layer-3 network can send packets only if the node is assigned a layer-3 address in the address space corresponding to the layer-3 network.

Protocols such as SIP provide a mechanism for a mobile node to operate in different locations served by different layer-3 address spaces. Typically, a mobile node operating at a home location registers with a SIP server ("home server") of that location. The information on the home server can then be used by correspondent nodes to initiate communication with the mobile node. Irrespective of which node initiates communication, a session is established with a correspondent node using the layer-3 address assigned to the mobile node in the location.

The mobile node can be moved to a new location served by a different layer-3 address space. The mobile node is assigned a new layer-3 address in the different layer-3 address space. The mobile node registers with a SIP proxy server in the new location. Registration generally entails providing an indication of the move and typically also notifying the SIP proxy server of the new IP address.

The SIP proxy server may communicate with the home proxy server to notify the home proxy server of the presence of the mobile node in the new location. Any necessary information may be exchanged between the two servers to enable correspondent nodes to communicate with the mobile node in the new location. Thus, the correspondent nodes can use the information in the home server and/or the proxy server to initiate applications afresh with the mobile node in the new location. The new layer-3 address may be used for the mobile node in the new location.

Thus, using protocols such as SIP, a mobile node may operate from different locations having different IP addresses. However, the approach(es) of above would operate accurately only when sessions (or applications) are started afresh in the new location, but not for sessions ("active session") which may be active when a mobile node moves to a new location. In other words, for sessions initiated after the move, the new layer-3 address would be used consistently by both the mobile node and the correspondent node, and communication would thus be established accurately.

On the other hand, for sessions which are active when a mobile node moves to the new location, one or both of the mobile node and correspondent node may be designed to continue to operate with the old address of the mobile node. The network (between the two nodes) may not be able to accurately deliver packets to the mobile node as the packets may be routed to the old layer-3 network.

As a result, the packets transmitted by the correspondent node may not be received by the mobile node. Consequently, sessions (and thus applications) which are active prior to a move may fail (terminate) when a mobile node moves from one geographical location to another, which is often undesirable. Therefore, what is needed is a method and apparatus for maintaining session connectivity when a mobile node moves from one layer-3 network to another.

SUMMARY OF THE INVENTION

An aspect of the present invention enables a session between a mobile node and a correspondent node to continue without terminating even if the mobile node is assigned a new address upon moving to a new location. Such a feature is achieved by performing network address translation (NAT) between an old address (assigned in a old location prior to the move) and the new address in network devices in a path between the mobile node and the correspondent node.

For example, a first hop router in the path from the correspondent node to mobile node is configured to replace a old address in the destination address field of a packet (received from mobile node) with a corresponding new address. As a result, the correspondent node can continue to send packets to mobile node with the old address, as before the move. Due to the use of the new address, the packet is routed accurately to the new location.

In an embodiment, another router at the new location may be configured to replace the new address with the old address in the destination address field. A static route may also be configured on the another router to ensure that the packet with the old address is delivered to the mobile node (even though the mobile node has been assigned the new address). Thus, packets are sent (at correspondent node) and delivered (to mobile node) using the old address as before the move, enabling the sessions to continue without terminating.

According to another aspect of the present invention, a mobile node sends both the old address and the new address in a registration message to a proxy server in the new location. By using the two addresses, the proxy server may configure the router at the first hop from the mobile node.

The mobile node may further determine a correspondent node related to each active session, and send the old and new addresses to a mobile server (e.g., a Session Initiation Protocol (SIP) server) serving the correspondent node. The server in turn may configure the first hop router in the path from the correspondent node to mobile node. Once the two routers are configured, the packets related to sessions active before the move, may be sent and delivered using the old address.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 2 is a flowchart illustrating a method which enables a mobile node and a correspondent node to continue to operate with the old IP address of the mobile node even after the mobile node moves;

DETAILED DESCRIPTION OF THE PREFERRED EMBODIMENTS

1. Overview and Discussion of the Invention

An aspect of the present invention allows an active session between a mobile node and a correspondent node to continue without failing (terminating) even if the mobile node is assigned a new layer-3 address when the mobile node moves from a home location to a new location. The feature may be achieved by translating the new layer-3 address (in the new location) to a old layer-3 address (in the home location), and vice versa.

As a result a correspondent node can continue to operate using the same old layer-3 address even after the mobile node moves to the new location, and active sessions terminating on the mobile node can continue to be supported. By appropriate implementation of other components, the mobile node can also be made to operate such that any sessions with the correspondent node also do not fail.

It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

Several aspects of the invention are described below with reference to example environments for illustration. It is useful to understand the basic terminal mobility provided by SIP to appreciate several aspects of the present invention. Accordingly, basic terminal mobility is described first.

2. Basic Terminal Mobility in an Example Environment

Figure 1:
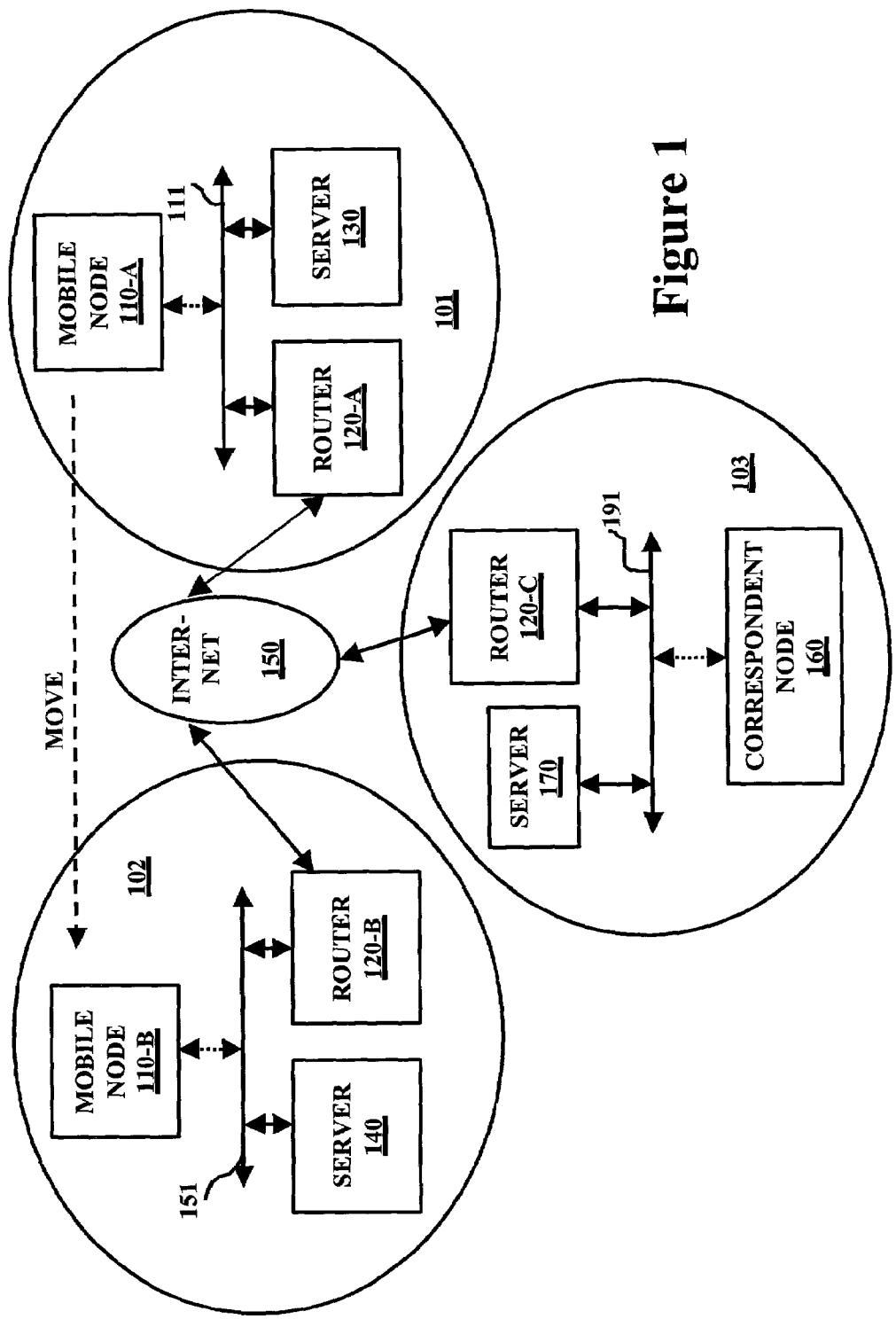
FIG. 1 is a block diagram illustrating the manner in which basic terminal mobility can be achieved using SIP.

FIG. 1 is a block diagram illustrating the manner in which session initiation protocol (SIP) generally supports basic terminal mobility (i.e., for a mobile node to operate from different locations). FIG. 1 is shown containing networks 111, 151 and 191, mobile node 110 (shown as 110-A in location 101 and 110-B in location 102), routers 120-A through 120-C, servers 130, 140 and 170, internet 150, and correspondent node 160. Each component is described in further detail below.

Mobile node 110-A, sub-network 111, router 120-A and server 130 are shown in location 101. Mobile node 110-B (same as mobile node 110-A, but in location 102), sub-network 151, router 120-B and server 140 are shown in location 102. Locations 101 and 102 are respectively referred to as old location and new location as the same mobile node is described as being moved from location 101 to location 102. Correspondent node 160, router 120-C, server 170 and sub-network 191 are shown in location 103 ("correspondent location").

Networks 111, 151 and 191 represent layer-3 networks in locations 101, 102 and 103 respectively. Each network (e.g., 111) provides connectivity among the connected components (e.g., server 130, router 120-A and mobile node 110-A). Routers 120-A, 120-B and 120-C are respectively shown connecting networks 111, 151 and 191 to internet 150. Networks 111, 151 and 191, routers 120-A, 120-B and 120-C and Internet 150 may be implemented using Internet Protocol (EP) in a known way.

Mobile node 110-A (in old location 101) represents a device such as a cell phone which is often carried by a user from one location to the other. Mobile node 110-A may communicate with correspondent node 160 and server 130 using a layer-3 protocol. Mobile node 110-A is shown accessing network 151 by using a wireless protocol (shown with a broken arrow). Mobile node 110-A is assigned a layer-3 address ("old address") in an address space assigned to network 111. The address may be assigned in a known way.

Server 130 represents a mobile server which generally assists mobile nodes to have terminal mobility. In an embodiment, server 130 is implemented consistent with SIP protocol (RFC 2543). For illustration it is assumed that server 130 operates as a 'home server' (also referred to as S-CSCF (serving call session control function)) for mobile node 110-A. In general, all mobile nodes (including 110-A) in location 101 may be registered with server 130 operating as a home server. When mobile node 110-A moves to new location 102, server 130 redirects SIP requests related to mobile node 110-A to server 140 to support basic terminal mobility.

The manner in which basic terminal mobility may be supported is described below with a situation in which mobile node 110-A moves to new location 102. The same mobile node is referred to as mobile node 110-B for clarity.

Mobile node 110-B is assigned a new layer-3 address in an address space corresponding to new location 102. The assignment may be performed in a known way using protocols such as dynamic host configuration protocol (DHCP). Mobile node 110-B registers the new address with proxy server 140.

Server 140 operates as a proxy server (P-CSCF, proxy call session control function) for mobile node 101-B in new location 102. Server 140 receives registration information including the old address and new address from mobile node 101-B. Server 140 determines the home server for mobile node 101-B (for example, by using DNS query, as is well known in the relevant arts) and communicates the new address for mobile node 110-A/B to home server 130.

Any new correspondent nodes can then initiate sessions with mobile node 110-B (in new location 102). To initiate a session/application with mobile node 110-B, correspondent node 160 generally determines the home proxy server for mobile node 110-B by sending an identifier (Uniform Resource Identifier in SIP environment) to server 170. Server 170 sends the identifier to a domain name system (DNS, not shown) to determine the home server of mobile node 110-B. DNS returns a layer-3 address of the home server of mobile node 110-B as server 130.

Server 170 sends a SIP request to server 130 to determine where mobile node 110-B is presently located. Server 130 redirects the SIP request to server 140 (based on the information exchanged after mobile node 110-A has moved to new location 102) and server 140 sends a SIP response to server 170 providing a new layer-3 address for mobile node 110-B. Correspondent node 160 may now initiate a session with mobile node 110-B using the provided layer-3 address.

Thus, correspondent node 160 can initiate sessions/applications to mobile node 110-B after mobile node 110-B has moved to new location 102. Similarly, mobile node 100-B can initiate sessions/applications to correspondent node 160 using the new address assigned at new location 102. Thus, mobile node 110-B may be said to have basic terminal mobility.

The approach described above would operate accurately when session are started afresh between mobile node 110-B and correspondent node 160. However, the above approach may not work for sessions ("active sessions") which are active/alive when mobile nodes move from old location 101 to new location 102. In particular, the packets transmitted by correspondent node 160 may not be received by mobile node 110-B causing any active sessions to terminate.

Accordingly, an approach using which active sessions may continue to operate without termination is described below.

3. Enabling Active Sessions to Continue after Mobile Node Moves

FIG. 2 is a flow-chart illustrating a method by which any active sessions may continue without termination when a mobile node moves to a new location. The method is described below with reference to FIG. 1 for illustration. However, the method may be implemented in other environments as well. The method begins in step 201, in which control immediately passes to step 210.

In step 210, the active sessions terminating on mobile node 110-B are determined. In an embodiment implemented in the context of Internet Protocol, the active sessions are determined by examining tables (e.g., active TCP/RCP ports) stored internally in mobile node 110-B. The determination can be performed in a known way. As may be appreciated, each active session has mobile node 110-B at one end and a correspondent node at another end. The rest of the steps are described with reference to correspondent node 160 as being at the other end of a session.

In step 220, a network device on the path from each correspondent node to mobile node 110-B is configured to translate old address to new address in the destination address field of each layer-3 packet. In an embodiment, the network device corresponds to first hop router 120-C present in the path from correspondent node 160 to mobile node 110-B.

By configuring router 120-C, correspondent node 160 can continue to send layer-3 packets with the old address (of location 101) in the destination field as the old address is immediately replaced with the new address in router 120-C at the first hop. The packets containing the new address may then be accurately routed to network 151 now containing mobile node 110-B. As a result, correspondent node 160 may continue to operate with the same view of the sessions both before and after mobile node 110-A/B moves, and the session is not terminated by correspondent node 160.

Another aspect of the present invention enables mobile node 110-B to receive packets with the old layer-3 address in the destination address field. Step 230 may be implemented to enable mobile node 110-B to receive packets with the old layer-3 address.

In step 230, another network device is configured to translate the new address back to old address in each layer-3 packet before delivery to mobile node 110-B. In an embodiment, network device corresponds to router 120-B which is also the closest (last hop) router to mobile node 110-B in location 102. One problem with such a configuration is that packets with old address in the destination field may be routed to old location 101. Accordingly, step 240 may be performed to ensure that the packets are delivered to mobile node 110-B in new location 102.

In step 240, network devices are configured to deliver packets with the old address (in destination field) to mobile node 110-B in new location 102. When router 120-B alone is configured in step 230, a static route may be configured in router 120-B to cause the packets with destination address of old address to be delivered to mobile node 110-B on network 151. The static route may be configured using protocols such as SNMP in a know way.

As noted above, network devices (routers 120-B and 120-C) may need to be configured to enable the sessions to continue to operate without termination after mobile node 101-A moves. The manner in which the configurations can be initiated/caused is described below.

4. Configuring Network Devices

Figure 3A:
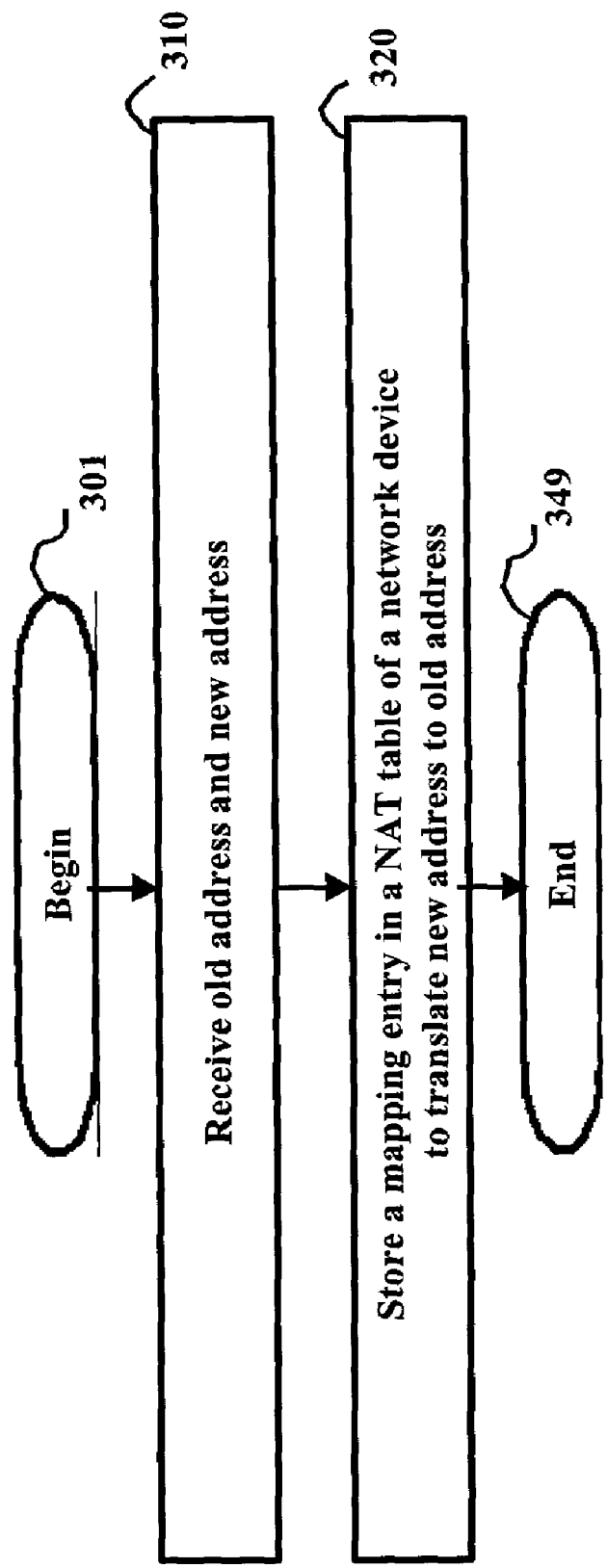
FIG. 3A is a flow chart illustrating a method using which a SIP server can be implemented to configure network devices to support terminal mobility according to an aspect of the present invention.

FIG. 3A is a flowchart illustrating a method by which the first hop routers 120-B ands 120-C may be configured to perform network address translation. The method is described below first with reference to server 140 of FIG. 1. The manner in which the method can be implemented in server 170 is described later. The method begins in step 301, in which control immediately passes to step 310.

In step 310, server 140 receives a message containing the old and new addresses of mobile node 110-A. The message may be received as a part of SIP registration, which is usually performed when a mobile node moves to a new location as described in further detail in RFC 2543. In an embodiment, the registration message format is modified to include the old address as described in a section below.

In step 320, server 140 stores a mapping entry in network address translation (NAT) table of router 120-B to cause router 120-B to translate the new address to the old address in the destination field of the packets received from Internet 150. The configuration may be performed using protocols such as SNMP in a known way. Server 140 may also configure a static route within router 120-B to send packets with the old address on network 151 to mobile node 110-B in new location 102.

Similarly, server 170 may also receive a message containing old and new addresses of mobile node 110-A, and configure a NAT table in router 120-C to cause the old address to be translated to new address in the destination address field of packets received from correspondent node 160. In an embodiment, each of the routers 120-A, 120-B and 120-C are respectively co-located (or integrated into one box) with a corresponding one of the servers 130, 140 and 170. Due to the co-location, reconfiguration of routers merely entails internal reconfiguration (typically of different tables) of the integrated boxes.

As described above, mobile node 110-B initiates configuration of routers 120-B and 120-C by sending appropriate messages to corresponding proxy/home servers. The operation of mobile node 110-B is summarized below with reference to the flow chart of FIG. 3B.

5. Mobile Node

Figure 3B:
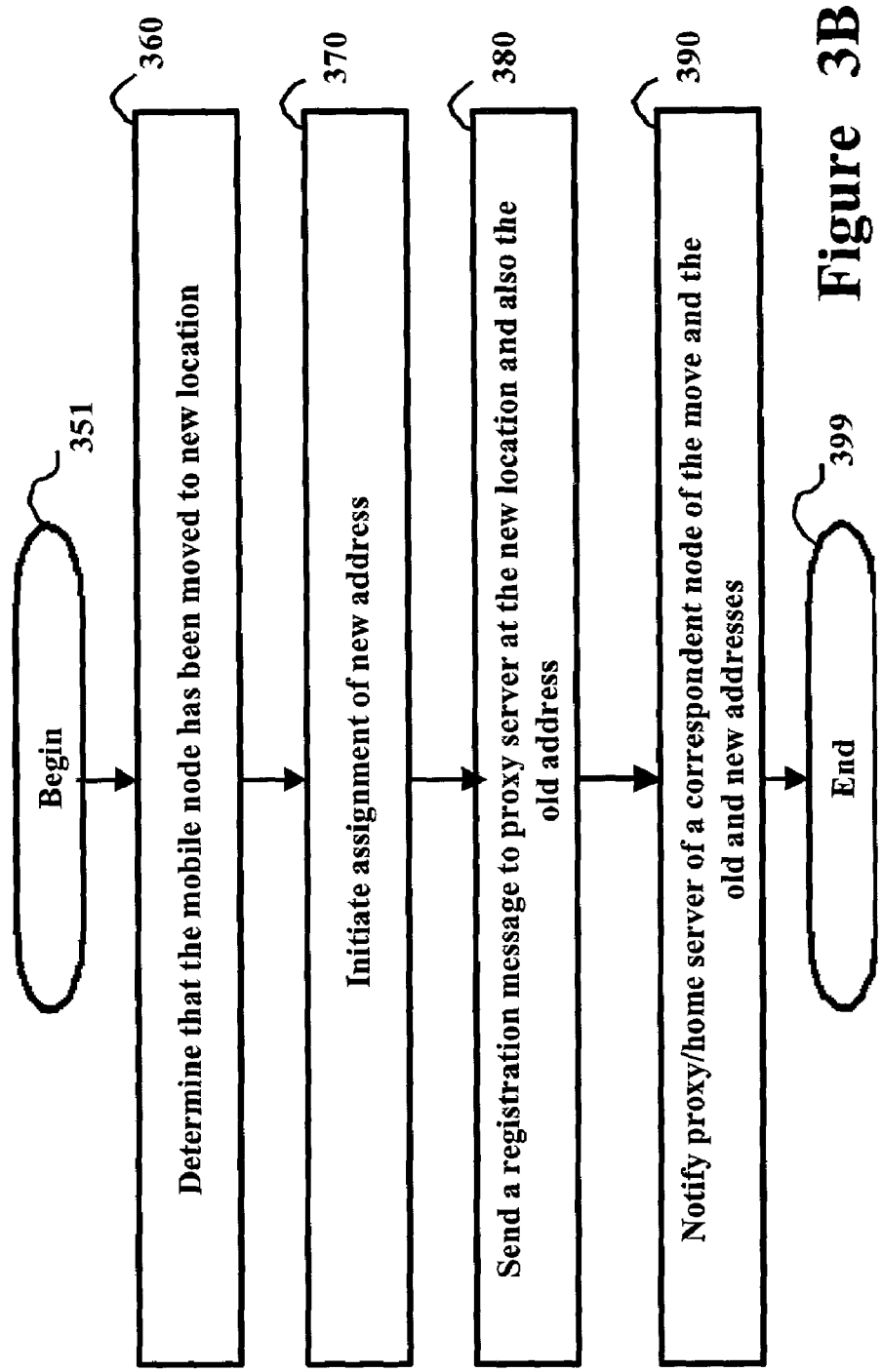
FIG. 3B is a flow chart illustrating a method using which a mobile node initiates configurations of various network devices to enable terminal mobility according to an aspect of the present invention.

FIG. 3B is a flow-chart illustrating a method using which a mobile node can cause configuration of various network devices. The method begins in step 351, in which control passes to step 360. In step 360, mobile node 110-B determines that it (mobile node 110-B) has been moved to new location 102. The determination can be performed in one of several known ways. Some examples are noted in the below paragraph.

In embodiments implemented consistent with SIP, mobile node 110-B may be implemented to determine presence in a new network by examining network notifications (e.g., ICMP message from foreign router 120-B). Alternatively, mobile node 110-B may periodically send SIP register requests and determine presence in a new network upon receiving a register reply message from a new server (server 140 instead of server 130).

In step 370, mobile node 110-B initiates assignment of a new IP address consistent with a protocol implemented in new location 102. Applications such as dynamic host configuration protocol (DHCP) may be used for such an assignment. When assigned, the new IP address is received by mobile node 110-B from a DHCP server (not shown).

In step 380, mobile node 110-B sends a registration message to proxy server 140 at new location 102. The proxy server may be determined in a known way and the new address may be used to send the registration message. The old address (used in old location 101) may also be sent along with the registration as described below with reference to an example embodiment(s).

In step 390, mobile node 110-B sends a notification message indicating the move and the two (old and new) addresses to proxy (or home) server 170 of correspondent node 160. Server 170 then causes configuration of router 120-C.

Once the configurations of routers 120-B and 120-C is complete, the nodes at either end of a session may continue to transmit packets as if move did not occur as described below with reference to an example.

6. Example

The approaches of FIGS. 2, 3A and 3B are illustrated with an example now. For illustration, it is assumed that old layer-3 (IP) address of mobile node 110-A (in location 101) is 1.1.1.1, and the address of the correspondent node 160 (in location 103) is 3.3.3.3.

Packets sent from mobile node 110-A to correspondent node 160 will generally have 1.1.1.1 as the source address and 3.3.3.3 as the destination address. On the other hand, packets sent from correspondent node 160 to mobile node 110-A will have a source address of 3.3.3.3 and destination address of 1.1.1.1. As described below, the mobile node 101-A and correspondent node 160 may continue to send and receive packets with the same IP addresses even after mobile node 110-A moves, as described below.

Mobile node 110-A/B is assumed to be assigned a new layer-3 address 2.2.2.2 when moved to new location 102. Mobile node 110-B registers with proxy server 140 present in new location 102 by sending a register request. The old address 1.1.1.1 and the new address 2.2.2.2 may also be passed to server 140.

Server 140 configures router 120-B to translate the new address to old address in the destination field of packets received from Internet 150. Similarly, server 170 also receives the old address and new address, and configures router 120-C to translate the old address (1.1.1.1) to the new address (2.2.2.2). A static route to send packets with the destination address of the old address to network 151 may also be configured in router 120-B as noted above with reference to step 240 of FIG. 2.

Once the configurations are complete, packets sent by correspondent node 160 with the old address (1.1.1.1) in the destination field may be delivered to mobile node 110-B as described now. Router 120-C performs network address translation to replace the old address 1.1.1.1 with new address 2.2.2.2. The new address causes the packet to be routed to router 120-B. Router 120-B performs network address translation again to replace the new address 2.2.2.2 with old address 1.1.1.1 and routes the packet to mobile node 110-B due to the static route.

Thus, correspondent node 160 may continue sending packets to mobile node 110-B with the old address 1.1.1.1 as destination address, even though mobile node 110-B has been assigned a new layer-3 address of 2.2.2.2 in new location 102. Similarly, mobile node 110-B may continue to send packets with a source address of 1.1.1.1, and the packets would get routed to correspondent node 160 as the source address is generally not examined during routing decisions.

While the embodiments of above are described as performing NAT only for packets sent from correspondent node 160 to mobile node 110-B, the first hop routers 120-B and 120-C may be configured to perform NAT in the other direction as well. In such a scenario, router 120-B replaces the old IP address (1.1.1.1) in the source address field with the new IP address (2.2.2.2), and the packet with the new address is transmitted via Internet 150 to router 120-C. Router 120-C replaces the new IP address with the old IP address before forwarding to correspondent node 160.

The description is continued with reference to the format of the packet when mobile node 110-B registers with proxy server 140.

7. Packet Format

When mobile node 110-B moves to new location 102, mobile node 110-B registers with server 140 by sending a register request. When sending the register request, mobile node 110-B passes the old address corresponding to old location 101 to server 140. In an embodiment implemented consistent with RFC 2543 (which is incorporated in its entirety herewith), an optional tag may be used to communicate the old address of mobile node 110-B. Assuming that old and new addresses of mobile node 110-A/B are 1.1.1.1 and 2.2.2.2 respectively, an example register message may contain the following information:

REGISTER sip:p-cscf.cisco.com SIP/2.0
Require: com.cisco.TerminalMobilityUsing Nat
Via: SIP/2.0/UDP p-cscf.com:5060
From: MN<sip:MN@p-cscf.com>
To: MN<sip:MN@p-cscf.com>
Call-ID: 123456789@p-cscf.com
CSeq: 1 REGISTER
Contact: <sip:MN@2.2.2.2>
Content-Length: 0
com.cisco.TerminalMobilityUsingNat:<sip:MN@1.1.1.1>

Only the lines which communicate the old address are described here for conciseness. The other lines can be interpreted consistent with RFC 2543. The Require statement (in line 2 above) indicates that a new optional tag with a URL of com.cisco. TerminalMobilityUsingNat is being used. The last statement provides a value of 1.1.1.1 as the old IP address (for the option tag referenced in the Require statement).

Similarly, mobile node 110-B may notify server 170 (the proxy or home server of correspondent node 160) of the move to new location and the new and old IP addresses. Any approaches may be used for such notifications. At least in situations when mobile node 110-A has initiated the active session using a SIP_invite packet (described in RFC 2543), the packet may be re-sent with the old address also being included in the invite packet. The same optional tag and format described above may be used to communicate the old address.

In other situations, mobile node 110-B may determine the presently serving home/proxy server of correspondent node 160 in a known way, and send the old address to server 170. The old address may be sent in a notification message which further in effect requests configuration of router 120-C at the first hop in the path from correspondent node 160 to mobile node 110-B.

Once the old IP address is communicated to SIP servers 140 and 170, the first hop routers may be configured as described above. The sessions which are active before mobile node 110-A is moved to new location 102, may then continue to operate without termination.

It should be understood that each feature of the present invention can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing routers 120-A through 120-C with a desired mix of hardware, software and/or firmware. An embodiment of router 120-A implemented substantially in software is described below.

8. Software Implementation

Figure 4:
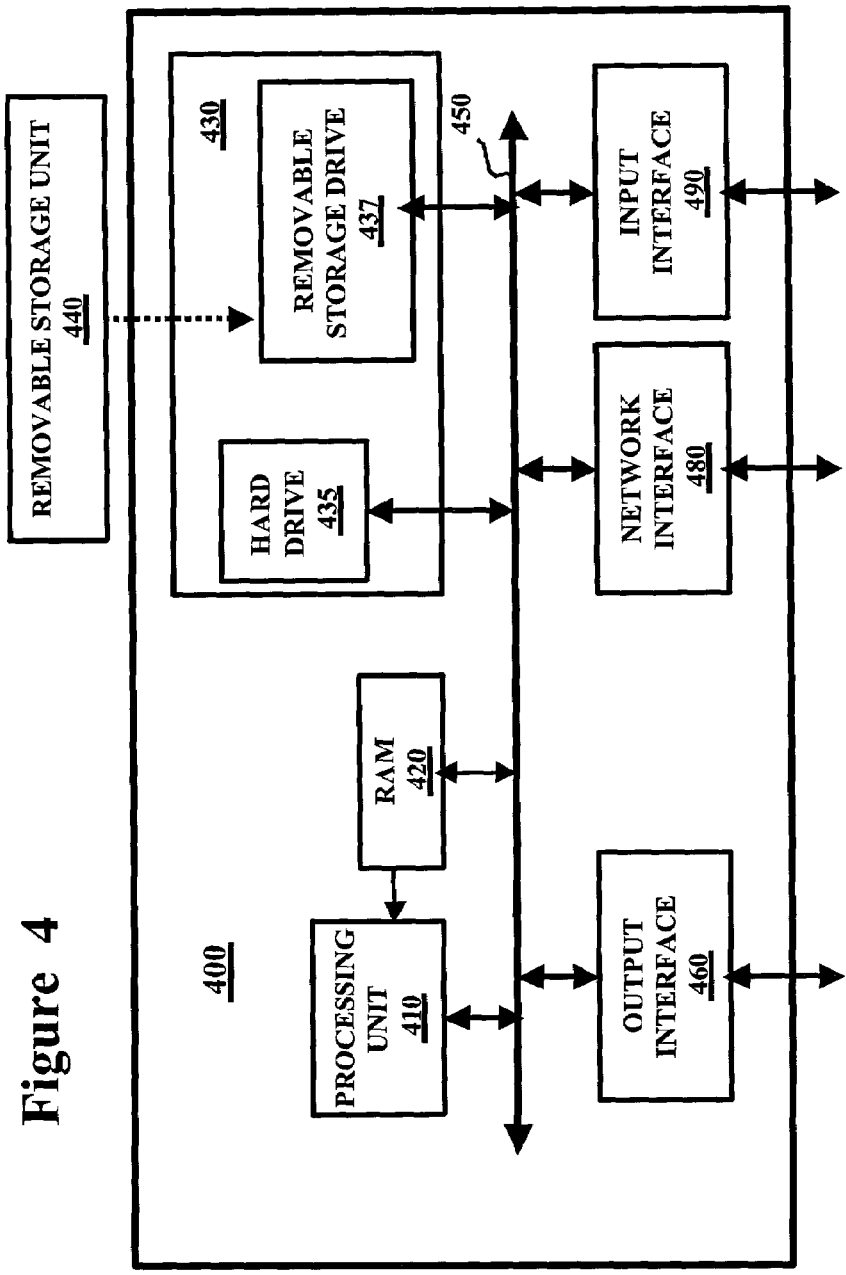
FIG. 4 is a block diagram illustrating an embodiment of the present invention implemented substantially in the form of software.

FIG. 4 is a block diagram illustrating the details of system 400, which may represent one of servers 140 and 170, and mobile node 110-B. System 400 is shown containing processing unit 410, random access memory (RAM) 420, storage 430, output interface 460, network interface 480 and input interface 490. Each component is described in further detail below.

Output interface 460 provides output signals (e.g., display signals to a display unit, not shown) which can form the basis for a suitable user interface for an administrator to interact with system 400. Input interface 490 (e.g., interface with a key-board and/or mouse, not shown) enables an administrator to provide any necessary inputs to system 400.

Output interface 460 and input interface 490 can be used, for example, to enable a network administrator to configure system 400 to provide various features of the present invention. For example, when system 400 corresponds to mobile node 110-B, an administrator may either enable or disable the feature of allowing the sessions to continue to operate upon move to a new location. When system 400 corresponds to one of servers 140 and 170, the administrator may specify the specific mechanism (e.g., SNMP) to be used in configuring the corresponding routers.

Network interface 480 enables system 400 to send and receive data on communication networks using internet protocol (IP). Network interface 480, output interface 460 and input interface 490 can be implemented in a known way.

RAM 420 and storage (secondary memory) 430 may together be referred to as a memory. RAM 420 receives instructions and data on path 450 from storage 430, and provides the instructions to processing unit 410 for execution. In addition, RAM 420 may be used to implement one or more of network address translation tables present in system 400.

Secondary memory 430 may contain units such as hard drive 435 and removable storage drive 437. Secondary storage 430 may store the software instructions and data, which enable system 400 to provide several features in accordance with the present invention.

Some or all of the data and instructions may be provided on removable storage unit 440, and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420. In general processing unit 410 reads sequences of instructions from various types of memory medium (including RAM 420, storage 430 and removable storage unit 440), and executes the instructions to provide various features of the present invention.

The description is continued with reference to an example implementation of server 130 substantially using integrated circuits.

9. Server

Figure 5:
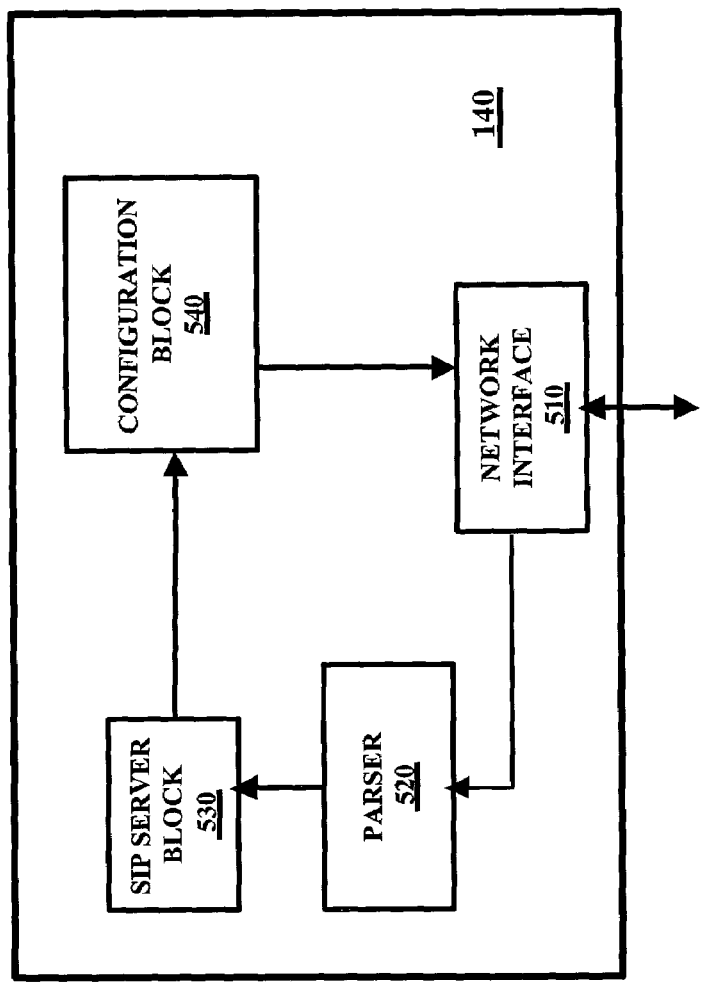
FIG. 5 is a block diagram illustrating an embodiment of server implemented substantially in the form of hardware.

FIG. 5 is a block diagram illustrating the details of an embodiment of server 140 as relevant to several aspects of the present invention. Server 140 is shown containing network interface 510, parser 520, SIP server block 530 and configuration block 540. Each block is described below in further detail.

Network interface 310 provides an electrical and protocol interfaces to receive and send internet protocol (IP) packets on network 151. Network interface 510 forwards received packets to parser 520. Similarly, packets received from configuration block 540 are transmitted on network 151. Network interface 310 may be implemented in a known way.

Parser 520 examines IP packets received from network interface 510 to determine the packets which are to be sent to SIP server block 530. If a received packet relates to SIP, the packet is sent to SIP server block 530 for further processing.

SIP server block 530 processes the packets consistent with RFC 2543. In addition, SIP server block 530 examines the packet for the optional tag (briefly described in section above) in SIP registration messages to determine the old layer-3 address. SIP server block 530 then passes the old and new (also contained in the SIP registration message) IP addresses to configuration block 540.

Configuration block 540 configures (NAT entries and static route) router 120-B using the old and new IP addresses received from SIP server block 530. Protocols such as SNMP may be used for the configuration. In general, a configuration message in the form of one or more IP packets may be sent using network interface 510 during such configuration.

Thus, server 140 of FIG. 5 can be used to configure router 120-B. It should be understood that when server 140 is integrated with router 120-B into one unit/box, configuration block 540 may merely need to store a NT entry in a NAT table (not shown) internal to the unit/box.

Server 170 may also be implemented similarly to configure the NAT entries in router 120-C. Once the two routers are configured, any sessions active prior to the move of mobile node 110-B may continue to operate without termination.

10. CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of enabling a session between a mobile node and a correspondent node to continue without termination when said mobile node moves from an old location to a new location, wherein said mobile node is assigned an old address in said old location and a new address in said new location, said old address being contained in a first layer-3 network address space and said new address being contained in a second layer-3 network address space, said method comprising:
   configuring a first network device to replace said old address with said new address in a destination address field of a packet sent by said correspondent node, wherein said first network device is located in a path from said correspondent node to said mobile node,
   wherein said configuring is performed after said mobile node moves from said old location to said new location, wherein said configuring enables said correspondent node to continue to send packets using said old layer-3 address even after said mobile node is assigned said new address.

2. The method of claim 1, further comprises configuring a second network device in said path to cause said second network device to replace said new address in said packet with said old address prior to delivering said packet to said mobile node such that said mobile node receives said packet with said old address in said destination address field.

3. The method of claim 2, further comprising configuring a static route on said second network device to cause said packet with said new address in said destination address field to be delivered to said mobile node in said second layer-3 address space.

4. The method of claim 3, wherein said configuring a second network device and said configuring a static route are performed from a proxy server located in said new location.

5. The method of claim 4, said method further comprising:
   receiving a registration message in said proxy server from said mobile node in said new location;
   receiving data representing said old address in said proxy server, and
   sending a configuration message to said second network device to store in a network address translation (NAT) table a mapping of said new address to said old address.

6. The method of claim 5, wherein said registration message contains said data representing said old address.

7. The method of claim 6, wherein said first network device comprises a first router located at a first hop from said correspondent node, and said second network device comprises a second router located at a first hop from said mobile node in said new location.

8. The method of claim 1, further comprising:
   determining in said mobile node that said session is active between said mobile node and said correspondent node; and
   sending a notification message to a server close to said correspondent node after said mobile node moves to said new location, wherein said notification message requests said configuring.

9. The method of claim 8, wherein said server causes said configuring in response to receiving said notification message wherein said notification message contains said new address and said old address.

10. The method of claim 9, wherein said server is implemented according to Session Initiation Protocol (SIP).

11. A method of enabling a session between a mobile node and a correspondent node to continue without termination when said mobile node moves from an old location to a new location, wherein said mobile node is assigned an old address in said old location and a new address in said new location, said old address being contained in a first layer-3 network address space and said new address being contained in a second layer-3 network address space, said method comprising:
   receiving in a first server said old address and said new address after said mobile node has moved from said old location to said new location, wherein said first server comprises a proxy server for said correspondent node; and
   configuring from said first server a network device, wherein said network device is located in a path between said mobile node and said correspondent node, wherein said network device comprises a first hop router at a first hop from said correspondent node, and said configuring comprises storing a mapping entry in a network address translation (NAT) table which causes said first hop router to map said old address in a destination address field of a packet to said new address.

12. The method of claim 11, wherein said old address and said new address are received in a registration message received from said mobile node and said first server performs said configuring upon receiving said registration message.

13. The method of claim 12, wherein said configuring configures a second router to map said new address in said destination address field of said packet to said old address, said method further comprising:
   configuring a static route in said second router to cause said packet with said old address to be delivered to said mobile node in said new location.

14. The method of claim 12, wherein said registration message is received according to Session Initiation Protocol (SIP).

15. The method of claim 11, wherein each of said new address and said old address comprises a Internet Protocol address.

16. A method of enabling a session between a mobile node and a correspondent node to continue without termination when said mobile node moves from an old location to a new location, wherein said mobile node is assigned an old address in said old location, said old address being contained in a first layer-3 network address space, said method being performed in said mobile node, said method comprising:
   initiating assignment of a new address after moving to said new location, said new address being contained in a second layer-3 network address space;
   receiving said new address;
   sending said old address and said new address to a proxy server at said new location, wherein said proxy server configures a network address translation (NAT) table in a first network device using said old address and said new address;
   determining a correspondent node related to said session; and
   sending said old address and said new address to an another server serving said correspondent node, wherein said another server configures a NAT table in a second network device using said old address and said new address.

17. A server enabling a session between a mobile node and a correspondent node to continue without termination when said mobile node moves from an old location to a new location, wherein said mobile node is assigned an old address in said old location and a new address in said new location, said old address being contained in a first layer-3 network address space and said new address being contained in a second layer-3 network address space, said server comprising a proxy server for said correspondent node, said server comprising:
   a network interface receiving said old address and said new address after said mobile node has moved from said old location to said new location; and
   a configuration block configuring a network device located in a path between said mobile node and said correspondent node, said network device comprising a router at a first hop from said correspondent node, wherein said configuration block stores a mapping entry in a network address translation (NAT) table to cause said network device to map said old address in a destination address field of a packet to said new address.

18. The server of claim 17, wherein each of said new address and said old address comprises a Internet Protocol address.

19. A server enabling a session between a mobile node and a correspondent node to continue without termination when said mobile node moves from an old location to a new location, wherein said mobile node is assigned an old address in said old location and a new address in said new location, said old address being contained in a first layer-3 network address space and said new address being contained in a second layer-3 network address space, said server comprising a proxy server for said correspondent node, said server comprising:
   means for receiving in said server said old address and said new address after said mobile node has moved from said old location to said new location; and
   means for configuring from said server a network device wherein said network device is located in a path between said mobile node and said correspondent node, said network device comprising a router at a first hop from said correspondent node, wherein said configuration block stores a mapping entry in a network address translation (NAT) table to cause said network device to map said old address in a destination address field of a packet to said new address.

20. The server of claim 19, wherein each of said new address and said old address comprises an Internet Protocol address, and wherein said proxy server is integrated with said router into one box.

21. A mobile node in which a session between a mobile node and a correspondent node can continue without termination when said mobile node moves from an old location to a new location, wherein said mobile node is assigned an old address in said old location, said old address being contained in a first layer-3 network address space, said mobile node comprising:
   means for initiating assignment of a new address after moving to said new location, said new address being contained in a second layer-3 network address space;
   means for receiving said new address;
   means for sending said old address and said new address to a proxy server at said new location, wherein said proxy server configures a network address translation (NAT) table in a first network device using said old address and said new address;
   means for determining a correspondent node related to said session; and
   means for sending said old address and said new address to an another server serving said correspondent node, wherein said another server configures a NAT table in a second network device using said old address and said new address.

22. A system for enabling a session between a mobile node and a correspondent node to continue without termination when said mobile node moves from an old location to a new location, wherein said mobile node is assigned an old address in said old location and a new address in said new location, said old address being contained in a first layer-3 network address space and said new address being contained in a second layer-3 network address space, said system comprising:
   means for configuring a first network device to replace said old address with said new address in a destination address field of a packet sent by said correspondent node, wherein said first network device is located in a path from said correspondent node to said mobile node, wherein said configuring is performed after said mobile node moves from said old location to said new location, wherein said configuring enables said correspondent node to continue to send packets using said old layer-3 address even after said mobile node is assigned said new address.

23. The system of claim 22, further comprises means for configuring a second network device in said path to cause said second network device to replace said new address in said packet with said old address prior to delivering said packet to said mobile node such that said mobile node receives said packet with said old address in said destination address field.

24. The system of claim 23, further comprising means for configuring a static route on said second network device to cause said packet with said new address in said destination address field to be delivered to said mobile node in said second layer-3 address space.

25. The system of claim 24, said system further comprising:
means for receiving a registration message in said proxy server from said mobile node in said new location;
means for receiving data representing said old address in said proxy server, and
means for sending a configuration message to said second network device to store in a network address translation (NAT) table a mapping of said new address to said old address.

26. The system of claim 25, wherein said registration message contains said data representing said old address.

27. The system of claim 26, wherein said first network device comprises a first router located at a first hop from said correspondent node, and said second network device comprises a second router located at a first hop from said mobile node in said new location.

28. The system of claim 22, further comprising:
means for determining in said mobile node that said session is active between said mobile node and said correspondent node; and
means for sending a notification message to a server close to said correspondent node after said mobile node moves to said new location, wherein said notification message requests said configuring.

29. A computer readable medium carrying one or more sequences of instructions for causing a system to enable a session between a mobile node and a correspondent node to continue without termination when said mobile node moves from an old location to a new location, wherein said mobile node is assigned an old address in said old location and a new address in said new location, said old address being contained in a first layer-3 network address space and said new address being contained in a second layer-3 network address space, wherein execution of said one or more sequences of instructions by one or more processors contained in said system causes said one or more processors to perform the action of:
configuring a first network device to replace said old address with said new address in a destination address field of a packet sent by said correspondent node, wherein said first network device is located in a path from said correspondent node to said mobile node,
wherein said configuring is performed after said mobile node moves from said old location to said new location,
wherein said configuring enables said correspondent node to continue to send packets using said old layer-3 address even after said mobile node is assigned said new address.

30. The computer program product claim 29, further comprises configuring a second network device in said path to cause said second network device to replace said new address in said packet with said old address prior to delivering said packet to said mobile node such that said mobile node receives said packet with said old address in said destination address field.

31. The computer program product of claim 30, further comprising configuring a static route on said second network device to cause said packet with said new address in said destination address field to be delivered to said mobile node in said second layer-3 address space.

32. The computer program product of claim 31, wherein said configuring a second network device and said configuring a static route are performed from a proxy server located in said new location.

33. The computer program product of claim 32, further comprising:
receiving a registration message in said proxy server from said mobile node in said new location;
receiving data representing said old address in said proxy server; and
sending a configuration message to said second network device to store in a network address translation (NAT) table a mapping of said new address to said old address.

34. The computer program product of claim 33, wherein said registration message contains said data representing said old address.

35. The computer program product of claim 34, wherein said first network device comprises a first router located at a first hop from said correspondent node, and said second network device comprises a second router located at a first hop from said mobile node in said new location.

36. The computer program product of claim 29, further comprising:
determining in said mobile node that said session is active between said mobile node and said correspondent node; and
sending a notification message to a server close to said correspondent node after said mobile node moves to said new location, wherein said notification message requests said configuring.

37. The computer program product of claim 36, wherein said server causes said configuring in response to receiving said notification message, wherein said notification message contains said new address and said old address.

38. The computer program product of claim 37, wherein said server is implemented according to Session Initiation Protocol (SIP).

39. A computer readable medium carrying one or more sequences of instructions for causing a server to enable a session between a mobile node and a correspondent node to continue without termination when said mobile node moves from an old location to a new location, said server comprising a proxy server for said correspondent node, wherein said mobile node is assigned an old address in said old location and a new address in said new location, said old address being contained in a first layer-3 network address space and said new address being contained in a second layer-3 network address space, wherein execution of said one or more sequences of instructions by one or more processors contained in said server causes said one or more processors to perform the action of:
receiving in said server said old address and said new address after said mobile node has moved from said old location to said new location; and
configuring from said server a network device, wherein said network device is located in a path between said mobile node and said correspondent node, said network device comprising a router at a first hop from said correspondent node, wherein said configuration block stores a mapping entry in a network address translation (NAT) table to cause said network device to map said old address in a destination address field of a packet to said new address.

40. The computer program product of claim 39, wherein each of said new address and said old address comprises a Internet Protocol address.

41. A computer readable medium carrying one or more sequences of instructions for causing a system to enable a session between a mobile node and a correspondent node to continue without termination when said mobile node moves from an old location to a new location, wherein said mobile node is assigned an old address in said old location, said old address being contained in a first layer-3 network address space, wherein execution of said one or more sequences of instructions by one or more processors contained in said system causes said one or more processors to perform the action of:

initiating assignment of a new address after moving to said new location, said new address being contained in a second layer-3 network address space;

receiving said new address;

sending said old address and said new address to a proxy server at said new location, wherein said proxy server configures a network address translation (NAT) table in a first network device using said old address and said new address;

determining a correspondent node related to said session; and sending said old address and said new address to an another server serving said correspondent node, wherein said another server configures a NAT table in a second network device using said old address and said new address.

\* \* \* \* \*

UNITED STATES PATENT AND TRADEMARK OFFICE
CERTIFICATE OF CORRECTION

PATENT NO. : 7,082,118 B1  
APPLICATION NO. : 09/987527  
DATED : July 25, 2006  
INVENTOR(S) : Aseem Sethi It is certified that error appears in the above-identified patent and that said Letters Patent is hereby corrected as shown below:

Col. 4, Line 40, replace "(EP)" with --(IP)--

Col. 5, Line 35, replace "mobile node 100-B" with --mobile node 110-B--

Col. 5, Line 52, replace "after" with --After--

Col. 11, Line 23, replace "NT entry" with --NAT entry--

Col. 12, Line 34, replace "sage" with --sage,--

Col. 14, Line 8, insert "," after the word "device"

Col. 15, Line 14, replace "," with --;--

Signed and Sealed this

Twelfth Day of December, 2006

JON W. DUDAS  
*Director of the United States Patent and Trademark Office*